United States Patent [19]

Bertelsen et al.

[11] 4,415,131

[45] Nov. 15, 1983

[54] ARC WING AIRCRAFT

[75] Inventors: William R. Bertelsen, Rock Island; William D. Bertelsen, Neponset, both of Ill.

[73] Assignee: Bertelsen Inc., Neponset, Ill.

[21] Appl. No.: 146,636

[22] Filed: May 5, 1980

[51] Int. Cl.³ .............................. B64C 3/54; B64C 9/00
[52] U.S. Cl. .................................... 244/13; 244/218;
244/45 R; 244/87; 244/123; 244/DIG. 1
[58] Field of Search ...................... 244/DIG. 1, 13, 16,
244/34 R, 34 A, 35 R, 45 R, 218, 90 R, 123,
87–88

[56] References Cited

U.S. PATENT DOCUMENTS

| 1,010,842 | 12/1911 | Baldwin | 244/45 R |
| 1,022,903 | 4/1912 | Warrick | 244/90 R |
| 1,060,273 | 4/1913 | Meloff | 244/13 |
| 1,085,263 | 1/1914 | Jenkins | 244/218 |
| 1,215,226 | 2/1917 | Wanee | 244/45 R |
| 1,653,903 | 12/1927 | Hall | 244/218 |
| 2,074,765 | 3/1937 | Adams | 244/88 |
| 3,930,624 | 1/1976 | Thompson | 244/DIG. 1 |
| 4,116,407 | 9/1978 | Murray | 244/DIG. 1 |

FOREIGN PATENT DOCUMENTS

| 43697 | 3/1910 | Austria | 244/45 R |
| 419741 | 1/1911 | France | 244/45 R |
| 428897 | 9/1911 | France | 244/34 R |
| 533604 | 3/1922 | France | 244/34 A |
| 626977 | 9/1927 | France | 244/45 R |

Primary Examiner—Galen L. Barefoot
Attorney, Agent, or Firm—FitzGibbon, Roehrig, Greenawalt & Stone

[57] ABSTRACT

A lightweight, man carrying aircraft including a skeletal fuselage assembly in combination with a primary arc-shaped lifting airfoil having variable camber, incidence angle, and pitching moment and a secondary stabilizing airfoil of a tubular, ring-like configuration. The arc-shaped primary airfoil is superior to traditional low speed airfoil forms due to its high aerodynamic efficiency, inherent design simplicity and strength. The ring-tail assembly, offering marginal aerodynamic lift, contributes significantly to the in-flight stability and safety of the aircraft. Both airfoil members are independently controllable and constructed of a fabric or like skin material which is fitted over a wing assembly and tensioned into an operable airfoil form by the aerodynamic forces of the air during flight. Typically, the wing assemblies are supported and maintained by a lightweight, tubular fuselage structure to which is affixed the propulsion system, control mechanisms and ground support assemblies.

23 Claims, 8 Drawing Figures

ARC WING AIRCRAFT

BACKGROUND OF THE INVENTION

The present invention relates in general to aircraft, and in particular, to lightweight, portable aircraft having improved flight, safety, and construction characteristics. More specifically, this invention relates to an improved aircraft including a primary, arc-shaped lifting airfoil in combination with a secondary stabilizing airfoil assembly, both supported and fixed relative to each other by a tubular fuselage assembly.

The airfoil assemblies are constructed of a fabric or like skin material tensioned over an adjustable wing frame and utilize the dynamic forces of the air during flight to bias stretch the wing skin into the desired wrinkle-free airfoil configuration.

The invention herein disclosed provides an adjustable, lightweight, tensioned fabric structure which forms a near zero thickness, single surface airfoil having increased strength, high lift potential and superior aerodynamic properties.

Numerous different configurations of lightweight, low speed aircraft have been proposed in the prior art, but these designs have failed to obtain optimum flight and safety characteristics.

Typically, prior art devices have utilized traditional wing airfoil shapes to supply the aerodynamic lift necessary for sustained flight. Such prior craft have employed expensive, complex, and often dangerously fragile construction and design techniques in order to obtain light weight. In addition, known techniques have often required substantial expenditures of time and effort to assemble and disassemble them, and yet have not always provided a sturdy, lightweight aircraft capable of effective operation.

To overcome these shortcomings, some prior art aircraft have had to sacrifice desirable flight capabilities and characteristics in order to achieve the objective of low weight and/or economy. Such designs, in reducing weight at the expense of performance and strength, have, of necessity, compromised the overall safety of the aircraft in addition to its ruggedness and simplicity of design.

The present invention, however, due to its innovative design, and methods of contruction, makes it possible to construct a ligthweight and inexpensive aircraft, overcoming the deficiencies present in most prior art devices. Not only is the structure of simple construction, minimizing maintenance and expense, but it is also inherently safe and rugged as well. The arc-shaped, fabric tension, wing design provides great overall wing strength in addition to inherent pitch and spiral stability without deleterious wing-fuselage joints present in conventional foil designs. Substantial wing end plate effects, stall stability and resistance to downward wing loading, most often applied by wing gusts or currents, are also properties inherent in this design, but typically unfound in the prior air for an aircraft of comparable weight and simplicity.

The aircraft of the invention attains aerodynamic efficiency far superior to other similar devices previously disclosed. The arc-like configuration of the invention utilizes a relatively short wing span, requiring minimal storage and transportation area, while offering high lift and minimizing aerodynamic drag and other deleterious properties present in more traditional wing designs. An example of an arc-like configuration of the prior art not capable of the improved results of the invention is disclosed in U.S. Pat. No. 3,572,614 issued to William R. Bertelsen on March 30, 1971.

SUMMARY OF THE INVENTION

It is, therefore, an object of this invention to provide an improved lightweight, low speed aircraft.

A further object of this invention is to optimize the flight and aerodynamic properties of lightweight, low speed aircraft.

Another object of this invention is to minimize initial costs and expenses incurred in subsequent usage and maintainance of lightweight, low speed aircraft.

A still further object of this invention is to simplify the construction of lightweight aircraft, thereby affording ease of assembly, disassembly and repair thereof.

Still another object of this invention is to minimize the effort and space required in transportation and storage of lightweight, low speed aircraft.

Another object of this invention is to optimize the safety of aircraft, during all flight conditions while maintaining overall lightweight, portability and superior flight characteristics.

A further object of this invention is to optimize the available aerodynamic adjustments of lightweight aircraft both prior to and during flight.

A still further object of this invention is to minimize the design complexity of lightweight aircraft, thereby affording manufacturing economy and simplicity.

These and other objects are attained in accordance with the present invention wherein there is provided a lightweight aircraft having a tubular fuselage in combination with a primary arc-like lifting airfoil and a secondary stabilizing control airfoil having a ring-like configuration.

The frame components are assembled using a lightweight, high strength, tubular material with the airfoil members constructed of fabric or other like skin material affixed to the eliptical plan form air foil frame. The near zero thickness foil material assumes the desired wrinkle free foil shape when tensioned by the dynamic forces of the air resulting in a stallproof airfoil having high lift, low drag and powerful pitch stability. This novel design and construction method yields an extremely lightweight and economical aircraft having exceptional flight behavior and functional characteristics without many of the deleterious aspects of conventional airfoil shapes.

The exact manner in which the foregoing and other advantages and objects are attained in practice will become more clearly apparent when reference is made to the following detailed description of the preferred embodiment of the invention set forth by way of example and shown in the accompanying drawings wherein like reference numerals indicate corresponding parts throughout.

DESCRIPTION OF THE DRAWINGS

Further objects of this invention, together with additional features contributing thereto, will be apparent from the following description of several embodiments of the invention when read in conjunction with the accompanying drawings wherein.

DESCRIPTION OF THE PREFERRED EMBODIMENT

Figure 1:
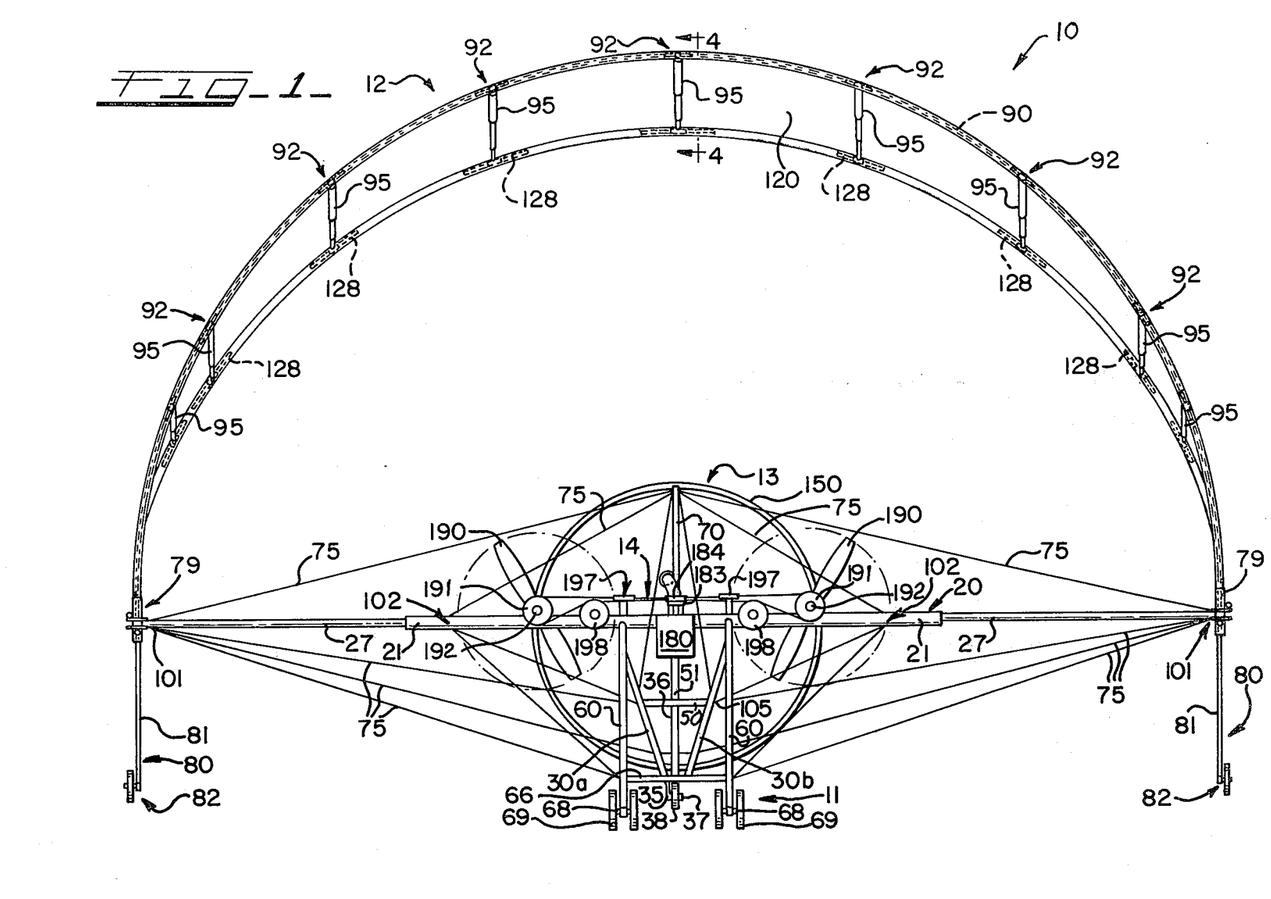
FIG. 1 is a frontal plan view showing the aircraft of the invention in an operative position.

Referring now to the drawings in greater detail, in FIG. 1, there is shown a frontal plan view of an aircraft with the components thereof illustrated in operable position. The aircraft shown therein, generally designated 10, includes a tubular fuselage, and ground support assembly 11, in combination with a semi-circular, arc-like, primary airfoil assembly 12, a secondary, stabilizing ring tail assembly 13, and a power system 14 adapted to supply propulsive force sufficient to enable sustained flight.

The fuselage assembly 11 is constructed of a lightweight, high strength, tubular material of varying diameters in combination with high strength, aerodynamic tension cables. The fuselage functions primarily as a base apparatus, supporting and maintaining the other elements of the aircraft, such as the primary lifting airfoil assembly 12, the tail airfoil assembly 13, the propulsion system 14, and the ground support assemblies. The primary element of the fuselage assembly is a main fuselage spar 20, positioned having an axis substantially perpendicular to a line approximating the intended line of flight of the aircraft and horizontal to the ground when the aircraft is viewed at rest, in an upright and operative position, as shown in FIGS. 1, 2 and 3.

Figures 2, 6, 7:
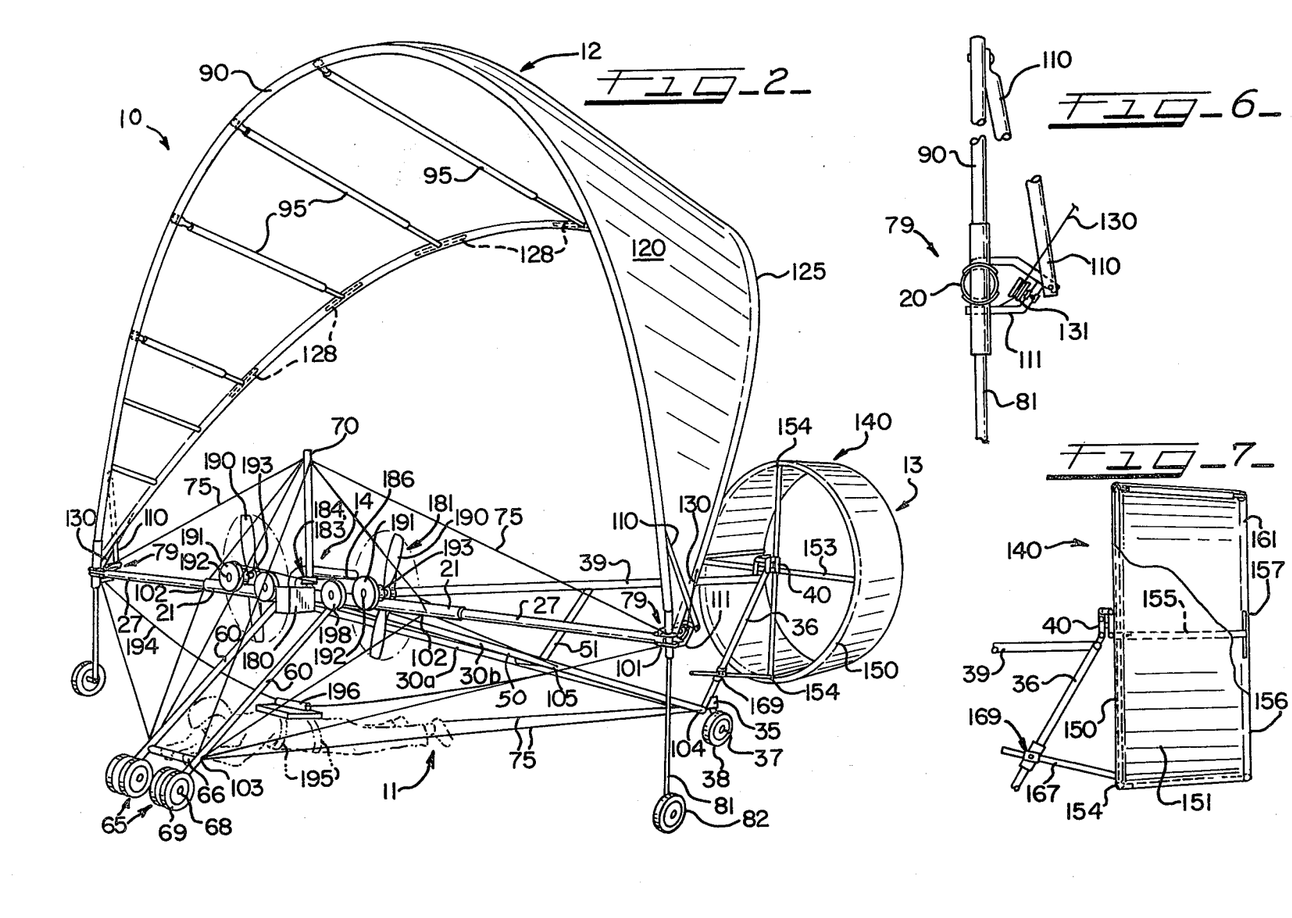
FIG. 2 is a side and frontal perspective view showing the aircraft of the invention in an operative position with the pilot shown therein.
FIG. 6 is a fragmentary plan view of a portion of the wing tip connection of the aircraft of the invention.
FIG. 7 is a fragmentary side plan view of the tail assembly of the invention with portion thereof shown in phantom.
Figures 3, 8:
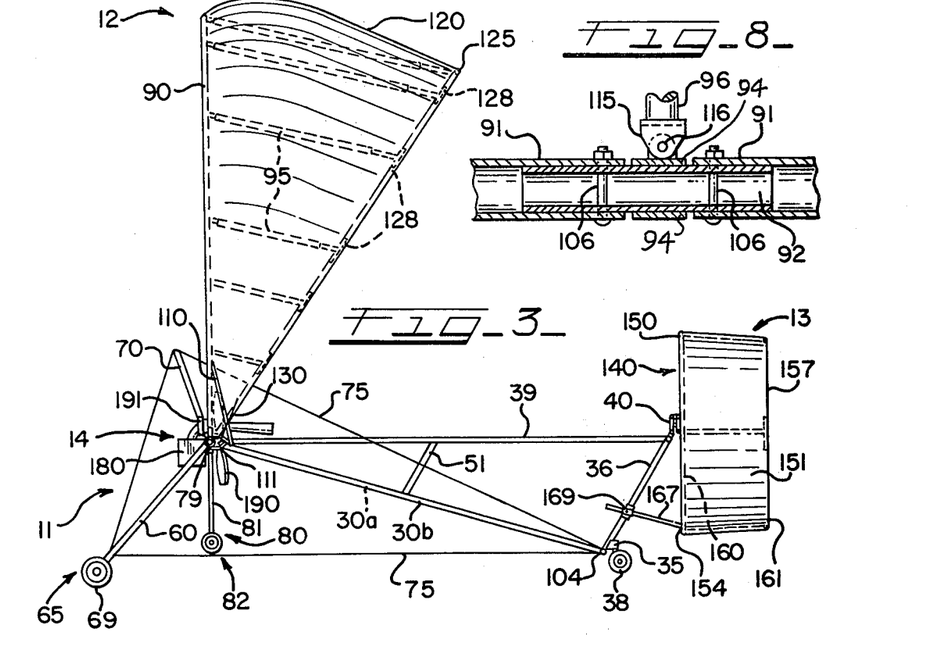
FIG. 3 is a side plan view of the aircraft shown in an operative position with portions thereof shown in phantom.
FIG. 8 is a top sectional view of a portion of the composite leading edge tube showing the leading edge components in a linked and operative position.

The main frame spar 20, as shown in FIGS. 1, 2 and 3, is a composite tube structure, constructed of two sizes of tubular material having differing diametric dimensions. The larger diameter tubing 21 is located at the center of the composite main spar 20 and extends outwardly an equivalent distance in both directions, to points approximately midway between the center and ends of the main spar. At the outermost ends of the larger diameter frame spar component 21 are inserted the smaller diameter main frame spar component tubes 27, which have an outer diameter substantially the same as the inner diameter of the larger spar component 21. These smaller tubular spar components are removeably inserted into the larger main spar tube and extend an equivalent distance out of and away therefrom, thus determining the wing span dimensions of the aircraft.

Originating at points an equal distance on either side of the center of the main frame spar 20 and extending rearwardly and downwardly therefrom, are two rear fuselage support tubes, 30a and 30b, having cross sectional diameters significantly smaller than that of the main frame spar 20, as shown in FIGS. 1, 2 and 3. These smaller rear fuselage support tubes extend back, meet, and are fixedly joined, by a welded or other suitable connection, at a point corresponding to the position where the rearward ground support wheel assembly 35 is affixed to the aircraft fuselage assembly 11, as shown in FIGS. 1, 2 and 3. These rear fuselage tubes comprise the lower portion of the aircraft fuselage assembly and serve to support the rear wheel assembly 35 and the stabilizing tail foil assembly 13.

The rearward ground support wheel assembly 35 comprises an "L" shaped cantilever axle member, having the axle 37 thereof positioned substantially parallel to the ground when viewed at rest in an operative position in FIGS. 1, 2 and 3. A standard wheel 38 is fitted upon the axle so as to permit free rotation thereon. The upper end of the vertically extending portion of the cantilever member engages the connection between fuselage support tubes 30a and 30b and the tail assembly support tube 36 in such a way as to permit free rotation of the rear wheel assembly about an axis substantially vertical when viewed as in FIGS. 1, 2 and 3. In operation, the rear wheel assembly swivels freely about the frame connection, permitting unrestricted movement of the rear of the craft, thereby simplifying movement and storage thereof.

Extending upwardly and rearwardly from the rear ground support wheel connection 35 is the tail assembly support tube 36. This tail assembly support tube 36 extends upwardly and joins the fuselage backbone tube 39 which extends horizontally rearward from its connection at the center of the main frame spar 20, when the aircraft is viewed in an upright and operable position as in FIGS. 1, 2 and 3. These two tubes comprise the tail support apparatus and their junction serves as a mounting for the hingedly adjustable tail foil connection 40 which permits aerodynamic adjustment and control primarily in the pitch and yaw modes.

At points on both rear fuselage support tubes 30a and 30b, approximately midway between the main spar 20 connection and the rear support wheel 35 connection, is located a transversely positioned strengthening tube 50, which spans between, and fixedly links, the two rear fuselage support tubes 30a and 30b, thereby contributing to their overall strength and rigidity. A similar strengthening tube 51 is positioned and affixed at the center of the transverse strengthening tube 50 and extends perpendicularly upward therefrom to the horizontal fuselage backbone tube 39, such that the two strengthening tubes, 50 and 51, when viewed in a frontal plan view as in FIG. 1, form a strengthening truss of an inverted "T" configuration.

Attached to the main frame spar 20, by welded or other suitable methods, and extending downwardly and forwardly therefrom are two parallel front ground support struts 60. These support struts are constructed of a tubular material having a diameter slightly smaller than that utilized in the main frame spar 20. At the forward most and lowest point on each strut is located a front ground support wheel assembly 65. The support wheel assembly 65 is constructed of horizontally positioned axles 68 having axes parallel to the axis of the main frame spar 20. The axles are affixed to and extend outwardly from both sides of each ground support strut 60 a distance sufficient to accommodate a wheel 69 on each. In this configuration, two wheels are affixed to each strut 60, each being concentrically fitted and maintained on the axle 68.

At points located on the front ground support struts 60, slightly behind and above the ground wheel assemblies 65, is affixed a transversely positioned support strut cross member 66, as shown in FIGS. 1 and 2. This cross member is affixed to each front ground support strut 60, by welded or other suitable methods, having an axis substantially parallel to the main frame spar 20 and substantially perpendicular to the intended direction of flight. This cross bar provides added strength and rigidity to the front ground support assembly in addition to support and control means for the pilot of the craft in the form of a hand grip.

Originating at the center of the main frame spar 20 and extending upwardly and forwardly therefrom is a tension cable support member 70. This support member extends upwardly to a height sufficient to permit unobstructed placement of fuselage retaining cables 75, which eminate from its uppermost end.

The fuselage retaining cable 75, eminating from the cable support member 70, extend therefrom to points slightly inside the outer most ends of the main frame spar 20 designated 101, to points slightly inside of the transition point between the larger and smaller diameter main spar component tubes designated 102, to points corresponding with the point of connection between both front ground support struts 60 and the ground support cross bar 66 designated 103 and to the point 104 located at the junction of the rear fuselage support tubes 30a and 30b, the tail assembly support tube 36 and the rear support wheel assembly 35. Additional cables extend from the front ground support strut-cross member connection 103 to; the points slightly inside the outermost end of the main frame spar, 101; the points slightly inside the large-small main frame spar transition, 102; and the point at the rear support and tail support tube connection, 104. Cables also link the points designated 105 corresponding to the connection between the rear fuselage support tubes, 30a and 30b, and the horizontal, transversely positioned strengthening tube 50 with the points 101 slightly inside the outerwing tip ends and the points 102 slightly inside the tube size transition on both sides of the main frame spar 20. Finally, two cables originate from the hinged tail assembly connection 40 and extend forward to the points slightly inward of the tube size transition on the main frame spar 20 designated 102.

At the outermost ends of the composite main frame spar 20 are wing tip connections 79 linking the main arc-like airfoil assembly 12 with the fuselage assembly 11. Extending perpendicularly downward from these wing tip connections, are wing tip support wheel assemblies 80. Each such wheel assembly is comprised of a vertically positioned support tube 81, fixed at its uppermost end to the wing tip connection 79 and having at its lower end a small cantilevered wheel assembly 82. The wheel assemblies 82, when in an operative position as shown in FIGS. 1, 2 and 3, are positioned slightly above the plane determined by the two front wheel assemblies 65 and the rear wheel assembly 35, such that they will contact the ground only upon tipping of the aircraft or substantial warpage or bending of the main frame spar 20.

Extending upwardly from the wing tip connections 79 at both ends of the main frame spar 20 is an arc-shaped, leading edge wing tube 90, comprised of a plurality of tube segments 91 linked together into one composite leading edge tube. This composite leading edge tube 90, when assembled, has its ends affixed to the frame assembly 11 at the wing tip connections 79 and assumes a "D" shape when viewed in a frontal plane view as in FIG. 1. The semi-circular arc-shape defines a plane substantially perpendicular to the desired direction of flight and has a radial axis substantially parallel to the horizontal fuselage backbone tube 39.

As with the other tubular components utilized in the aircraft, the leading edge tube segments 91 are constructed of a high strength, lightweight material, fastened together by connecting barrels 92 and linking bolts 106 as shown in FIG. 8. In this configuration, the composite leading edge tube 90, independently resists rearward deflection and warpage due to the dynamic forces of the air during flight.

Additional resistance to rearward deflection of the composite leading edge tube 90 is provided by additional wing support members 110, shown in FIGS. 2, 3 and 6, attached to the leading edge tube 90 at points slightly above the wing tip connections 79 and directly behind the leading edge tube 90, when the invention is viewed in a frontal plan view as in FIG. 1. These wing support members 110 extend downwardly and rearwardly from their connection with the leading edge tube 90 to points of attachment on horizontal rearwardly extending portions 111 of the wing tip connection assemblies 79. The wing support members 110 in combination with the leading edge tube 90 and the rearwardly extending wing tip connection portions 111 form a triangular wing support assembly when viewed in an operative side plane view as in FIG. 3.

At symmetric and varying distances around the leading edge tube 90 are points corresponding to the leading edge component tube connections at which are located hingedly attached variable length chord sticks 95. These chord sticks dictate the chord length at varying points on the wing arc with the maximum length chord stick located at the crest of the arc-shaped leading edge tube 90 and the shortest chord stick being positioned at a point slightly above the wing tip connection 79.

Figure 4:
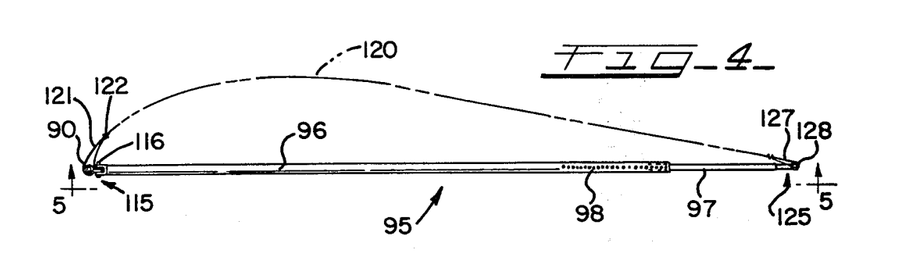
FIG. 4 is a side, partially sectional plan view of the airfoil assembly of the invention taken along lines 4—4 of FIG. 1.

As noted above, the chord sticks 95 have telescopic length adjustment, such that the wing chord dimensions can be readily changed to afford the desired aerodynamic qualities. This telescopic length adjustability is attained through the use of two chord stick tubes 96 and 97 for each chord stick needed, as shown in FIG. 4. One of the component tubes 96 is larger, having an inside diameter equivalent to, or slightly larger than, the outer diameter of the smaller tube 97, such that the smaller tube 97 can slide concentrically within the larger tube 96. At various points on both component tubes corresponding pin or bolt holes 98 are located, such that the bolt or pin 99 can be inserted therethrough fixing the smaller inner tube 97 relative to the larger outer tube 96. In this way, numerous chord lengths are attainable with each chord stick, while allowing ready alteration thereof.

Figure 5:
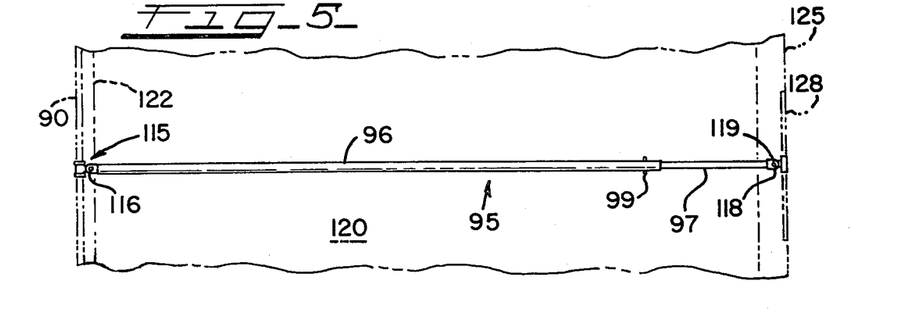
FIG. 5 is a fragmentary bottom plan view of the airfoil of the invention taken along lines 5—5 of FIG. 4 with portions thereof shown in phantom.

The chord sticks 95 are affixed to the leading edge tube 90 by clevis pin connection 115 which in turn is affixed to sleeve 94 as shown in FIGS. 4, 5 and 8. The clevis pin 116 thereof having an axis substantially vertical, thereby permitting only horizontal planar rotation of the chord stick 95 about the pin axis. In this manner, the chord sticks 95 are horizontally and vertically moveable, allowing them to swing down or "luff" in zero wind speed as well as permitting ease of assembly.

Affixed to the leading edge tube 90 and extending rearward therefrom, over the telescopic chord sticks 95, is the fabric-like wing skin material 120. This wing skin forms a canopy over the aircraft, having its greatest chord length at the top or crown of the leading edge tube arc and diminishing to a chord length of zero at points slightly above the wing tip connection 79, as shown in FIGS. 1, 2 and 3. This skin material, when tensioned by the dynamic forces of the air, assumes the desired airfoil configuration which creates the needed aerodynamic lift for sustained flight.

As shown in FIG. 4, the wing skin 120 is attached to the leading edge tube 90 by folding over it, forming a tube-like cuff 121 through which the leading edge tube is inserted. This tunnel-like cuff is maintained by sewing, or affixing by other appropriate means, the front skin edge to the skin at a point, 122, behind the leading edge tube 90, as also shown in FIG. 4.

The skin material extends rearward from this cuffed connection 121, over the chord sticks 95, to the trailing edge of the wing skin 125. At the trailing edge the wing skin is formed into a cuff 127, similar to that at the leading edge 121, which serves both as a wing skin reinforcement and a connection for the trailing end of the chord sticks 95.

The trailing edge connection is very similar to that shown at the leading edge, however, instead of a continuous arc-shaped frame member being inserted into the cuff tunnel as is done with the leading edge tube 90, smaller non-continuous batten segments 128 are used to anchor the rearward ends of the chord sticks 95 in the cuff tunnel of the wing skin trailing edge 127, as shown in FIGS. 1, 3, 4 and 5. These batten segments extend perpendicularly out a short distance from the end of chord sticks 95 forming a "T" shaped structure, but not so far as to come in contact with the batten segment of the adjacent chord sticks, as shown in phantom in FIGS. 1, 3 and 5.

These batten segments 128 are attached to the trailing end of the chord sticks 95 by a clevis pin connection 118 similar to that shown in the leading edge connection. The axis of the clevis pin 119 is substantially parallel to the pin axis of the leading edge clevis connection 115.

At the lower ends of the wing skin canopy, slightly above the wing tip connections 79, the wing skin chord length diminishes to zero. At or slightly above this lowest point, an incidence angle adjustment cable 130 is fixedly attached to the reinforced wing skin trailing edge 125. This adjustment cable is routed from this connection around a pulley 131, shown in FIG. 6, attached to the wingtip connection 79, to a position on the front ground support struts 60 which is easily reached by the pilot when situated in an operative position. By tightening or loosening both ends of this cable, the reinforced trailing edge of the wing skin 125 is tightened or loosened and accordingly, the incidence angle of the airfoil, formed by the wing skin 120, can be altered, thereby changing the flight characteristics of the craft as desired.

At the junction of the tail assembly support tube 36 and the fuselage backbone tube 39, is located a tail assembly connection joint 40, hingedly linking the tail assembly 13 to the frame assembly 11. The tail assembly connection joint 40 of the preferred embodiment shown in FIG. 7, comprises a hinge having a single axis of rotation lying horizontally perpendicular to the fuselage backbone tube 39. The hinged connection permits only rotational movement in the vertical plane perpendicular to the ground when the aircraft is viewed in an operative position as shown in FIGS. 1, 2, 3 and 7.

Alternatively, a universally adjustable connection would be utilized in place of the hinged connection 40, allowing movement or adjustment to the tail assembly 13 about a plurality of axes or planes.

The tail assembly 13 of the preferred embodiment is of a tube-like configuration having its radial axis generally aligned parallel with the intended line of flight of the aircraft, as shown in FIGS. 2 and 3. The assembly is constructed of a light-weight skeletal frame structure 140, covered by a fabric envelope 151 of material identical or similar to that utilized in the primary arc wing 12 assembly.

At the leading edge of the tail assembly frame structure is a tail assembly leading edge tube 150 which is formed into a circular configuration having a cross-sectional diameter significantly smaller than the diameter formed by the main airfoil leading edge tube 95. The circular tail leading edge tube 150 is attached at its radial center to the hinged tail assembly connection 40 by radial spokes 153 which eminate from the tail assembly connection 40 and extend therefrom to the tail assembly leading edge tube 150 as shown in FIG. 2. As also shown in FIG. 2, the tail spoke apparatus of the preferred embodiment consists of two sets of spoke members, one set having a vertical axis substantially perpendicular to the ground and the other set being horizontal having its axis substantially perpendicular to the vertical spokes. In combination the two spoke sets form a "cross" defining a vertical plane oriented substantially perpendicular to the desired direction of flight as shown in FIGS. 1, 2 and 3.

The radial tail spokes 153 are affixed to the tail assembly leading edge tube 150 by a suitable connection 154 affording fixed engagement as well as ready removal, thereby permitting simplified assembly and disassembly.

Attached to and extending perpendicularly rearward from each tail spoke leading edge tube connection 154 are lightweight tail envelope support rods 155. These envelope support rods are fixedly attached to the tail spoke connections 154 so as to retain, at all times, their perpendicular orientation relative to the plane determined by the tail spoke assembly thereby retaining the desired tubular tailfoil shape.

As shown in FIGS. 3 and 7, the envelope support rods extend rearward from the tail spoke connections 154 to the trailing edge of the tail foil envelope 156. At the trailing end of each envelope support rod is a trailing edge "T" member 157, the arms of which extend perpendicularly a short distance away from the support rods, along a line approximating the circular trailing edge as shown in FIG. 7.

The fabric envelope 151, which covers the tail assembly support structure, attaches thereto in much the same way as does the wing skin 120 on the primary arc wing 12. Both the leading and trailing edges have folded cuffs 160 and 161, into which are inserted the tail assembly leading edge tube 150 and the trailing edge "T" members 157, as shown in FIGS. 3 and 7. The tail envelope material is tightly fitted to the tail assembly structure and unlike the main arc wing, it does not require the dynamic air forces to form it into its operative aerodynamic shape, although such forces do augment its shape somewhat.

At or slightly above the connection linking the lower segment of the vertical tail spoke 153 with the circular tail leading edge tube 150 is located a tail assembly control rod 167. This control rod is hingedly attached either to the vertical tail spoke 153, the leading edge tube 150 or the connection 154 linking the two, and extends forwardly or forwardly and upwardly therefrom to an adjustably fixed connection 169 on the tail assembly support tube 36.

The adjustable connection 169 permits the tail assembly control rod 167 to be moved either forward or backward, relative thereto, thereby moving the lower edge of the tail leading edge tube 150 and causing the entire tail assembly to hingedly rotate about the hinged tail assembly connection 40. In this way, the vertical component of the tube-like tail assembly's radial axis is adjustably altered to give a desired aerodynamic effect.

The power system of the preferred embodiment, generally designated 14, is centrally located on the main frame spar 20 and consists of a power unit 180, propeller assemblies 181, and a plurality of pulley, belt, and shaft members which transmit the power between the two, as shown in FIGS. 1, 2 and 3.

The power supplying unit 180 of the preferred embodiment is a small, internal combustion engine, mounted at the center of the main frame spar 20 and positioned on top and slightly forward thereof, as shown in FIGS. 1, 2 and 3. The engine 180, is oriented such that the rotating, power transmitting shaft 185 extends vertically upward, having the axis of rotation substantially perpendicular to the main frame spar 20.

Rigidly fixed to the power imparting shaft 185, is a centrifugal clutch rotor 183 which serves to control the power transmitted to the other parts of the system, as a function of engine speed. Also rigidly fitted onto the engine shaft 185, directly atop the clutch rotor 183, is a belt driving sheave member 184. This sheave or pulley member drives the power transmitting belts 186 which extend outward and provide power to the propeller assemblies 181. The propeller assemblies are comprised of a propeller unit 190, a propeller drive pulley 191, a propeller shaft 192 and a bearing mounting assembly 193 affixing the entire propeller assembly to the main frame spar 20.

The propeller unit 190 of the preferred embodiment is positioned behind the main frame spar 20 having a rotational axis substantially horizontal to the ground when viewed at rest at an operable position and perpendicular to the main frame spar 20, as shown in FIGS. 1, 2 and 3.

The propeller shaft 192 extends forward from its connection with the propeller unit along the rotational axis thereof. The shaft extends through the bearing members of the propeller mounting assembly 193 to a point slightly forward of the main frame spar. Rigidly affixed to the forward most end of this forwardly extending portion of the propeller shaft is the propeller drive belt 186. The belts 186 are positioned and tensioned such that when they are rotated around the engine drive pulley 184 a similar rotation is imparted to the propeller drive pulley 191. This rotation is transmitted by the propeller shaft through the bearing members of the propeller assembly mounting to the propeller units, resulting in rotation thereof.

Due to the relative positioning of the engine 180 and the propeller assembly 181, the engine shaft 185 and the propeller shafts 192 are misaligned by 90° or substantially perpendicular to each other. As shown in FIG. 1, as a result, the drive belts 186 must undergo a significant twisting to successfully link the engine drive pulley 184 with the propeller drive pulleys 191.

To facilitate the required belt twisting, as well as to insure trouble free operation, two sets of drive belt idler pulleys are installed on the main frame spar 20, one set on either side of the power unit 180. The first such idler pulley of each set is located slightly outside the engine until 180, on top of the main frame spar 20, having a vertical axis of rotation. The pulley is rigidly affixed to the main frame spar by a suitable mounting assembly and is aligned at the same horizontal height as the corresponding drive pulley 184 on the engine shaft.

These inner idler pulleys serve to tension and align the drive belt 186 as it leaves and enters the drive pulley assembly.

Located outward from the inner idler pulley along the main frame spar approximately midway between the engine 180 and the propeller assembly 190 is the second idler pulleys 198 of each set which is rigidly affixed to the main frame spar by suitable mounting methods. These second idler pulleys have rotational axes substantially parallel to the axis of the propeller shafts and substantially perpendicular to the rotational axis of the inner idler pulleys 197. In this position, the drive belts, upon leaving the drive pulley 194 and passing over the inner idler pulley 197, must undergo the required 90° twisting prior to engaging this pulley, in order to align properly therewith. Upon passing over the top of this second idler pulley, the drive belts 186 are sufficiently twisted and properly situated to engage the propeller drive pulley 191 in the most efficient and trouble free manner, thereby reducing the operational problems encountered with twisted belt drive mechanisms.

In operation, the drive belts 186 are positioned in such a way as to drive the propeller drive pulleys 191 and consequently the propeller units 190 in opposite rotational directions. Such opposing rotation permits the use of larger propellers without any torque reaction problems arising. Additionally, the pulley sizes and propeller configurations are carefully selected to provide the optimum propeller rotational speed and thrust force properties for a desired flight plan.

As shown in FIG. 2, the pilot support apparatus of the preferred embodiment is essentially a translatable trolley mechanism, comprised of a pilot support cable 194, a pilot harness 195 and a trolley wheel assembly 196.

The pilot support cable 194 is securely affixed to both ends of the main frame spar 20 at or about the wing tip connections 79. Sufficient slack is left in the cable 194 such that the pilot, when in an operable position, is suspended below the main frame spar a slight distance above the ground, as shown in FIG. 2. Located upon the pilot support cable 194 is a trolley wheel assembly 196, having trolley wheels aligned with and placed upon the pilot support cable, enabling rolling translation of the trolley wheel assembly along the length of the cable 194. This trolley wheel assembly is securely attached to a pilot harness 195 which is worn by the operator and serves to suspend him below the support cable and trolley wheel assembly as shown in FIG. 2. In use, the trolley wheel assembly and thus the pilot, are translated along the support cable as is desired by the pilot thereof, thereby altering the weight distribution and center of gravity location of the aircraft. By altering these elements, the flight characteristics and flight directions of the craft are altered as well.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. An aircraft comprising
   fuselage means forming the support structure of an aircraft,
   airfoil means carried by said fuselage means and adapted to provide aerodynamic lift during flight of the aircraft,
   said airfoil means forming a continuous wing surface of an arcuate configuration during flight,
   said continuous wing surface being formed of a flexible, fabric-like, material assuming said configuration during flight,
   said airfoil means extending upwardly from said fuselage means and having respective ends coupled thereto,
   said wing surface forming an increasing chord length from said ends to the upper portion of said airfoil means,
   said fuselage means includes a plurality of elongated fuselage members coupled to a rigid member to form a support structure having a skeletal frame construction,
   a airfoil means including a rigid leading edge member to which said material is pivotally attached, and
   said airfoil means further including a tensioned flexible trailing edge assuming the trailing edge configuration of said wing surface during flight,
   said airfoil means further including a plurality of airfoil form retaining means for supporting and defining said chord length of said airfoil means,
   said airfoil form retaining means having means to selectively adjust said chord length at predetermined positions along the arcuate configuration of said airfoil means.

2. An aircraft as recited in claim 1, wherein said airfoil form retaining means are hingedly attached to said airfoil leading edge means.

3. An aircraft as recited in claim 1, wherein said rigid leading edge member including a plurality of separable leading edge component members providing simplified assembly and disassembly and facilitating portability and storage of the aircraft.

4. An aircraft as recited in claim 1, wherein said airfoil form retaining means have a plurality of tubular rods hingedly attached to said rigid leading edge member and extending horizontally and perpendicularly rearward therefrom.

5. An aircraft as recited in claim 1, wherein said wing surface has a variable surface area as a function of position upward from said ends of the airfoil means.

6. An aircraft as recited in claim 5, wherein said wing surface area has a maximum value at the apex of said airfoil means and a minimum value at the connection between said airfoil means and said fuselage means.

7. An aircraft as recited in claim 1, wherein said wing surface has an adjustably tensioned trailing edge for providing a controllably adjustable angle of incidence of said airfoil means.

8. An aircraft as recited in claim 1, further including second air foil means coupled to said fuselage means for providing in-flight stability and control,
   a second leading edge member defining the cross-sectional configuration of said second airfoil means,
   said second leading edge member being hingedly attached to said aircraft fuselage.

9. An aircraft as recited in claim 8, wherein said second airfoil means includes,
   a plurality of airfoil form retaining members for defining the chord length of said second airfoil means,
   said form retaining members being attached to said second leading edge member and extending perpendicularly rearwardly therefrom.

10. An aircraft as recited in claim 9, wherein said second airfoil means includes,
    an airfoil fabric envelope forming an airfoil surface skin,
    said airfoil fabric envelope being adapted to fit tautly over and to attach to said leading edge means and said airfoil form retaining members.

11. An aircraft as recited in claim 8, wherein said second leading edge member has a circular configuration with a radius significantly smaller than the radius of curvature of the arcuate configuration of said other airfoil means.

12. An aircraft as recited in claim 1, wherein said aircraft further includes,
    a propulsion system for providing the requisite aerodynamic force to enable sustained flight.

13. An aircraft as recited in claim 12, wherein said propulsion means includes,
    a power source for supplying the required power to said propulsion means,
    said power source being affixed to said aircraft fuselage.

14. An aircraft as recited in claim 13, wherein said propulsion means includes,
    a pair of rotor means for creating an aerodynamic slipstream from the energy provided by said power source.

15. An aircraft as recited in claim 14, wherein said propulsion means includes,
    power transmission means for transmitting power from said power source to said rotor means,
    said power transmission means having a plurality of pulley means for tensioning and directing the transmission of power between said power source and said rotor means.

16. An aircraft as recited in claim 15, wherein said power transmission means includes,
    a plurality of sheave means for providing engagement means between said power source and said rotor means.

17. An airfoil adapted to be supported on an aircraft fuselage comprising,
    an airfoil means forming a continuous wing surface of an arcuate configuration during flight,
    said airfoil means extending upwardly from said fuselage means and having respective ends coupled thereto,
    said wing surface forming an increasing chord length from said ends to the upper portion of said airfoil means,
    said airfoil means includes rigid airfoil leading edge means for rigidly forming and defining the arcuate configuration of said airfoil means, said airfoil means further including a flexible trailing edge means capable of assuming the arcuate configuration of said foil means in flight, said airfoil means including an airfoil surface skin providing an aerodynamic lifting surface, said airfoil surface skin being comprised of a flexible, fabric-like material attached to said leading edge means and extending rearwardly therefrom to attachment with said trailing edge means of said airfoil means, said airfoil means includes a plurality of airfoil form retaining means for supporting and defining the chord length of said airfoil means, said airfoil form retaining means having means to selectively adjust the chord length and camber of said airfoil at predetermined positions along the arcuate configuration of said airfoil means.

18. An airfoil as recited in claim 17, wherein said airfoil form retaining means are hingedly attached to said airfoil leading edge means.

19. An airfoil as recited in claim 17, wherein said airfoil means includes, said airfoil leading edge means including a plurality of separable leading edge component members providing simplified assembly and disassembly and facilitating portability and storage of the aircraft.

20. An airfoil as recited in claim 17, wherein said airfoil form retaining means includes a plurality of tubular rods hingedly attached to said airfoil means and extending horizontally and perpendicularly rearward therefrom.

21. An airfoil as recited in claim 17, wherein said airfoil means includes, said airfoil surface skin having variable surface area as a function of position upward from said ends of said airfoil means.

22. An airfoil as recited in claim 21, wherein said airfoil surface area has a maximum value at the apex of said airfoil means and a minimum value at the connection between said airfoil means and said fuselage means.

23. An airfoil as recited in claim 17, wherein said airfoil surface skin has an adjustably tensioned trailing edge for providing a controllably adjustable angle of incidence of said airfoil means.

* * * * *